United States Patent [19]

Rahim

[11] Patent Number: 5,960,397
[45] Date of Patent: Sep. 28, 1999

[54] SYSTEM AND METHOD OF RECOGNIZING AN ACOUSTIC ENVIRONMENT TO ADAPT A SET OF BASED RECOGNITION MODELS TO THE CURRENT ACOUSTIC ENVIRONMENT FOR SUBSEQUENT SPEECH RECOGNITION

[75] Inventor: Mazin G. Rahim, Matawan, N.J.

[73] Assignee: AT&T Corp, New York, N.Y.

[21] Appl. No.: 08/863,927

[22] Filed: May 27, 1997

[51] Int. Cl.⁶ ........................................................ G10L 5/06
[52] U.S. Cl. ............................ 704/244; 704/233; 704/256
[58] Field of Search ................................... 704/226, 233, 704/244, 256

[56] References Cited

U.S. PATENT DOCUMENTS

| | | | |
|---|---|---|---|
| 4,720,802 | 1/1988 | Damoulakis et al. | 704/233 |
| 4,897,878 | 1/1990 | Boll et al. | 704/233 |
| 5,473,728 | 12/1995 | Luginbuhl et al. | 395/25.2 |
| 5,555,344 | 9/1996 | Zunkler | 395/2.51 |
| 5,579,436 | 11/1996 | Chou et al. | 395/2.53 |
| 5,590,242 | 12/1996 | Juang et al. | 395/2.54 |
| 5,617,486 | 4/1997 | Chow et al. | 704/244 |
| 5,721,808 | 2/1998 | Minami et al. | 704/233 |
| 5,727,124 | 3/1998 | Lee et al. | 704/233 |
| 5,761,639 | 6/1998 | Takebayashi et al. | 704/233 |
| 5,778,340 | 7/1998 | Hattori | 704/244 |
| 5,794,194 | 8/1998 | Takebayashi et al. | 704/251 |
| 5,854,999 | 12/1998 | Hirayama | 704/226 |

OTHER PUBLICATIONS

Yamaoto et al. Fast Speech Recognition Algorithm under Noisy Environment Using modified CMS_PMC and Improved IDMM+SQ.IEEE, 1997.

Lee et al. Representation of Hidden Markov Model for Noise Adaptive Speech Recognition. Electronics Letters. vol. 31 No. 8, Apr. 1995.

Frangoulis et al. Adaptation of the HMM Distributions: Application to a VQ Codebook and to a Noisy Environment. IEEE, Sep. 1992.

Erell et al. Noise Adaptations of HMM Speech Recognition Systems Using Tied–Mixtures in the Spectral Domain. IEEE Transactions on Speech and Audio Processing. vol. 5, No. 1, Jan. 1997.

Milner et al. Comparison of some noise–compensation methods for speech recognition in adverse environments. IEEE Proceedings Visual Image Signal processing. vol. 141, No. 5, Oct. 1994.

Treurniet et al. Noise Independent Speech Recognition for a variety of Noise Types. IEEE, 1994.

Cung et al. Noise Adaptation Algorithms for Robust Speech Recognition. Elsevier Science Publishers, 1993.

Rose et al. Robust Speaker Identification in Noisy Environments Using Noise Adaptive Speaker Models. IEEE, Jul. 1991.

Medwetz, J.M. Introduction to Sonar. IBM. Chapter 2, Dec. 3, 1991.

"Separating Style and Content" by J. Tenenbaum and W. Freeman, pp. 662–668.

"'Nice' Model–Based Compensation Schemes for Robust Speech Recognition" by M. Gales (10 pages).

"Family Discovery" by S. Omohundro, pp. 402–408.

*Primary Examiner*—David R. Hudspeth
*Assistant Examiner*—M. David Sofocleous

[57] ABSTRACT

A speech recognition system which effectively recognizes unknown speech from multiple acoustic environments includes a set of secondary models, each associated with one or more particular acoustic environments, integrated with a base set of recognition models. The speech recognition system is trained by making a set of secondary models in a first stage of training, and integrating the set of secondary models with a base set of recognition models in a second stage of training.

3 Claims, 3 Drawing Sheets

SYSTEM AND METHOD OF RECOGNIZING AN ACOUSTIC ENVIRONMENT TO ADAPT A SET OF BASED RECOGNITION MODELS TO THE CURRENT ACOUSTIC ENVIRONMENT FOR SUBSEQUENT SPEECH RECOGNITION

FIELD OF THE INVENTION

This invention relates generally to speech recognition systems, and more particularly to a system which integrates a set of "parallel" models and a base set of recognition models to reduce acoustic mismatch.

BACKGROUND OF THE INVENTION

Speech recognition is a process by which an unknown speech utterance (usually in the form of a digital PCM signal) is identified. Generally, speech recognition is performed by comparing the features of an unknown utterance to the features of known words or word strings.

The features of known words or word strings are determined with a process known as "training". Through training, one or more samples of known words or strings (training speech) are examined and their features (or characteristics) recorded as reference patterns (or recognition models) in a database of a speech recognizer. Typically, each recognition model represents a single known word. However, recognition models may represent speech of other lengths such as subwords (e.g., phones, which are the acoustic manifestation of linguistically-based phonemes). Recognition models may be thought of as building blocks for words and strings of words, such as phrases or sentences.

To recognize an utterance in a process known as "testing", a speech recognizer extracts features from the utterance to characterize it. The features of the unknown utterance are referred to as a test pattern. The recognizer then compares combinations of one or more recognition models in the database to the test pattern of the unknown utterance. A scoring technique is used to provide a relative measure of how well each combination of recognition models matches the test pattern. The unknown utterance is recognized as the words associated with the combination of one or more recognition models which most closely matches the unknown utterance.

Recognizers trained using both first and second order statistics (i.e., spectral means and variances) of known speech samples are known as hidden Markov model (HMM) recognizers. Each recognition model in this type of recognizer is an N-state statistical model (an HMM) which reflects these statistics. Each state of an HMM corresponds in some sense to the statistics associated with the temporal events of samples of a known word or subword. An HMM is characterized by a state transition matrix, A (which provides a statistical description of how new states may be reached from old states), and an observation probability matrix, B (which provides a description of which spectral features are likely to be observed in a given state). Scoring a test pattern reflects the probability of the occurrence of the sequence of features of the test pattern given a particular model. Scoring across all models may be provided by efficient dynamic programming techniques, such as Viterbi scoring. The HMM or sequence thereof which indicates the highest probability of the sequence of features in the test pattern occurring identifies the test pattern.

The testing and/or training utterances can come from various types of acoustic environments. Each acoustic environment (e.g., an age, a sex, a microphone type, a room configuration, etc.) produces distortion and acoustic artefacts which are characteristic of the acoustic environment.

A speech signal transmitted through a telephone (or other type of) channel often encounters unknown variable conditions which significantly degrade the performance of HMM-based speech recognition systems. Undesirable components are added to the communicative portion of the signal due to ambient noise and channel interference, as well as from different sound pick-up equipment and articulatory effects. Noise is considered to be additive to a speech signal. The spectrum of a real noise signal, such as that produced from fans and motors, is generally not flat and can degrade speech recognition system performance. Channel interference, which can be linear or non-linear, can also degrade speech recognition performance.

A typical conventional telephone channel effectively band-pass filters a transmitted signal between 200 Hz and 3200 Hz, with variable attenuations across the different spectral bands. The use of different microphones, in different environmental conditions, for different speakers from different geographic regions, with different accents, speaking different dialects can create an acoustic mismatch between the speech signals encountered in testing and the recognition models trained from other speech signals.

Previous efforts have been directed to solving the problem of maintaining robustness in automatic speech recognition for a variety of "mismatched" acoustic conditions existing between training and testing acoustic environments. For example, by assuming a naive model of the mismatch, it is possible to apply some form of blind equalization to minimize channel distortion and acoustic transducer effects. Also, by assuming prior knowledge of the statistics of the interfering signal, it is possible to combine this information during the recognition process to simulate a "matched" testing environment. Clearly, the inherent assumptions in such methods limit their generalization ability when extended to multiple acoustic environments, applications, network conditions, etc.

To make a speech recognition system more generally applicable to multiple differing acoustic environments, there have been attempts to gather enormous amounts of acoustically diverse training data from many types of acoustic environments from which to train the recognition models of the recognition system. This requires a large recognition model database with concomitant memory size and increased processing time. Often a wide variety of training data is not readily available, or is expensive to obtain.

Multiple separate sets of recognition models have been trained in an attempt to make speech recognition systems more robust, each set being associated with a particular acoustic environment, such as for example one for males and another one for females. The separate sets of recognition models are operated simultaneously. In testing, a test pattern is recognized-using all (e.g., both) sets of recognition models and then selecting the highest of the multiple (e.g., two) scores to generate the recognized utterance. This arrangement implies a need for two-times the memory size and two-times the processing time.

SUMMARY OF THE INVENTION

The present invention provides a speech recognition system in which a set of "parallel" (or "secondary") models, each associated with one or more particular acoustic environments, is integrated with a base set of recognition models and which effectively recognizes unknown speech coming from multiple acoustic environments.

In an illustrative embodiment of the invention, the speech recognition system is trained by making a set of parallel models in a first stage of training; and integrating the set of parallel models with a base set of recognition models in a second stage of training. More specifically, in the first stage of training the speech recognition system, a base set of recognition models is stored in a recognition database. The base set is split into N sets of current models, thereby defining N acoustic environments corresponding to the N sets of current models. The N sets of current models are stored in a classification database. The known training utterances are scored against each of the N sets of current models. Each of the known training utterances is assigned to one of the N defined acoustic environments based on the highest score of the known training utterance for the N sets of current models.

Each of the N sets of models associated with the N particular acoustic environments is discriminatively trained on the known training utterances assigned to that particular acoustic environment, thereby making N sets of new models. The N sets of new models are stored in the classification database in place of the N sets of current models.

The steps of scoring the known training utterances against each of the N sets of models, assigning each of the known training utterances to one of the N defined acoustic environments, and discriminatively training the N sets of new models on the known training utterances assigned to that particular acoustic environment are repeated until known training utterances are no longer being reassigned to particular acoustic environments as a result of the iterative process.

The N sets of new models can again be split into N' sets of models and the aforementioned iterative process steps repeated until defining additional acoustic environments is no longer desired.

Then, in the second stage of training the speech recognition system, for each of the particular acoustic environments defined in training stage one, the base set of recognition models is discriminatively trained using the known training utterances assigned to that particular acoustic environment to project the base set of recognition models to a new model space matching that particular acoustic environment. The set of differences between the state of the model parameters of the base set of recognition models before discriminative training and the state of the model parameters after discriminative training corresponds to the distortion due to the particular acoustic environment. The differences are clustered to save memory, and such limited set of differences is saved as the projector to adjust the base set of recognition models to reflect that particular acoustic environment.

As a result, each parallel model includes a classifier and a projector, wherein the projector is the limited set of differences for that particular acoustic environment which can be applied to transform the base set of recognition models to reflect that acoustic environment.

In an illustrative embodiment, the speech recognition system includes an acoustic transducer and receives unknown speech in the form of sound waves. The acoustic transducer converts the sound waves into an electrical unknown speech signal. A feature extractor generates a sequence of feature vectors characterizing the unknown speech signal. A classifier processor identifies an acoustic environment of the unknown speech based on the sequence of feature vectors using the set of parallel models, each associated with a particular acoustic environment, stored in the classification database. The classifier processor selects a projector from the one of the set of parallel models that corresponds to the identified acoustic environment. The selected projector is applied to the base set of recognition models stored in the recognition database, thereby adjusting the set of recognition models to more suitably match the identified acoustic environment of the unknown speech. A plurality of the adjusted recognition models is compared with the sequence of feature vectors to determine a comparison score for each such model. The highest comparison score is selected and the unknown speech is recognized based on the highest score.

Other aspects and advantages of the invention will become apparent from the following detailed description and accompanying drawing, illustrating by way of example the features of the invention.

DETAILED DESCRIPTION

For a better understanding of the invention, together with other and further objects, advantages, and capabilities thereof, reference is made to the following disclosure and the figures of the drawing, where like reference characters designate like or similar elements.

For clarity of explanation, the illustrative embodiments of the present invention are presented as comprising individual functional blocks (including functional blocks labeled as "processors"). The functions these blocks represent may be provided through the use of either shared or dedicated hardware, including, but not limited to, hardware capable of executing software. For example, the functions of processors presented in FIG. 1 may be provided by a single shared processor. (Use of the term "processor" should not be construed to refer exclusively to hardware capable of executing software.)

Illustrative embodiments may comprise digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided. Use of DSPs is advantageous since the signals processed represent real physical signals, processes and activities, such as speech signals, room background noise, etc.

The present invention improves the performance of speech recognizers in multiple acoustic environments, i.e., in environments where there is acoustic diversity in the speech signals tested and/or from which the recognition models were trained and provides an efficient way of handling distortion from multiple acoustic environments. A set of "parallel" (i.e., "secondary") models, each corresponding to a particular acoustic environment, is integrated with a base set of recognition models according to the principles of the invention. Each "parallel" model includes a classification model (i.e., a classifier), which is used for identifying the acoustic environment of the unknown speech, and a model transformation projector (i.e., a projector) for transforming the base set of recognition models to match that particular acoustic environment.

The classifier included within the parallel model for a particular acoustic environment can, for example, be a Gaussian Mixture Model (GMM), a Hidden Markov model (HMM), a vector quantization (VQ) codebook, or a machine learning system such as a neural network. The classifiers are applied in a maximum likelihood sense to the sequence of feature vectors characterizing the test utterance in the process of determining the most suitable acoustic environment for each test utterance. The projector for the particular acoustic environment is a limited set of differences arrived at by discriminatively training the base set of recognition models using the known training utterances associated with that particular acoustic environment.

During testing, the acoustic environment of the unknown speech is identified. A projector corresponding to the identified acoustic environment is selected. The projector is applied to transform the base set of recognition models, thereby adjusting the base set of recognition models to be more suitable for the identified acoustic environment. Then the unknown speech is recognized using the adjusted base set of recognition models.

Figure 1:
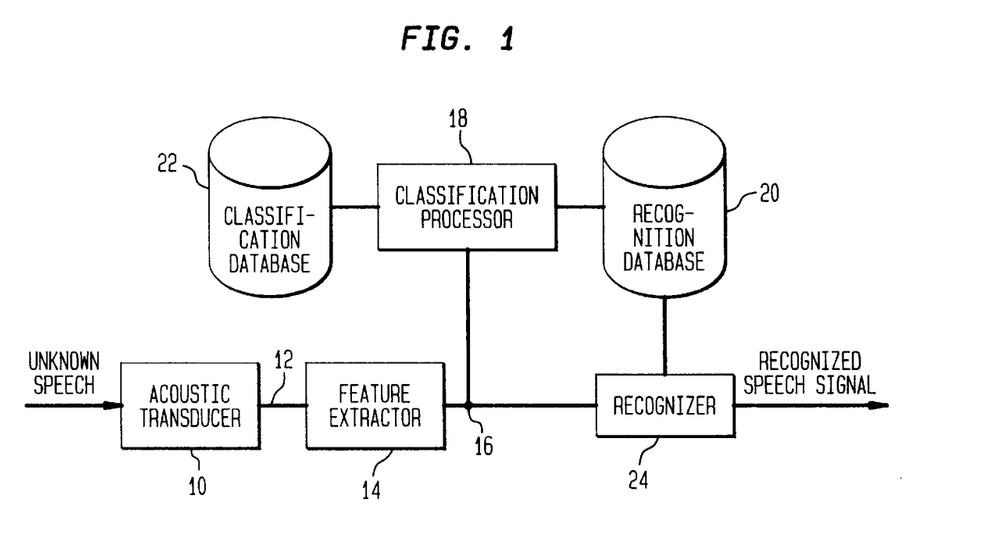
FIG. 1 is a schematic view illustrating a speech recognition system according to the principles of the invention.

Referring to FIG. 1, a speech recognition system according to an illustrative embodiment of the invention includes an acoustic transducer 10, such as a microphone in the handset of a telephone, for receiving unknown speech in the form of audible sound waves caused by expansion and rarefication of molecules of air with associated impurities. The acoustic transducer 10 converts the sound waves into electrical unknown speech signals 12. A feature extractor 14 is in electrical connection with the electrical signal output of the acoustic transducer 10. The feature extractor 14 generates a sequence of feature vectors 16 characterizing the electrical unknown speech signal 12. A classification processor 18 is coupled to the feature extractor 14. A recognition database 20 is coupled to the classification processor 18. A classification database 22 is coupled to the classification processor 18. The recognition database 20 stores a conventional base set of recognition models. The base set of recognition models comprises one or more HMMs and associated HMM parameters. Each of the one or more HMMs includes one or more (e.g., eight) Gaussian distributions per state, each Gaussian distribution having a mean and a variance (which are referred to as model parameters). The classification database 22 stores a set of parallel (i.e., secondary) models, each parallel model corresponding to a particular acoustic environment. Each parallel model includes a classification model (i.e., a classifier) and a model transformation projector (i.e., a projector). The group of classifiers, wherein each classifier is associated with one of the set of parallel models, is used for identifying the acoustic environment of the unknown speech. The projector is a limited set of differences used for transforming the base set of recognition models to more suitably match that particular acoustic environment. The limited set of differences for each particular environment is arrived at by discriminatively training the base set of recognition models on the known training utterances associated with that particular acoustic environment.

The classification processor 18 operates to (i) identify an acoustic environment of the unknown speech based on a probabilistic alignment of the sequence of feature vectors 16 characterizing the unknown speech signal 12 (and, thus the unknown speech) with the classifiers in the set of parallel models, (ii) select the projector from the one of the set of parallel models that corresponds to the identified acoustic environment, and (iii) apply a transformation based on the selected projector to the base set of recognition models, thereby adjusting the parameters of the HMMs (i.e., the means and/or variances of the Gaussian distributions) stored in the recognition database 20 to more suitably reflect the identified acoustic environment of the unknown speech.

A conventional recognizer 24, which can perform a standard Viterbi beam search, is coupled to the feature extractor 14 and the recognition database 20. The recognizer 24 compares a plurality of the adjusted HMMs stored in the recognition database 20 with the sequence of feature vectors 16 to determine a comparison score for each such model, selects the highest comparison score, and generates a recognized speech signal based on the highest score.

The speech recognition system shown in FIG. 1 is trained by (i) making the set of parallel models in a first stage of training and (ii) integrating the set of parallel models with the conventional base set of recognition models in a second stage of training.

TRAINING STAGE I

Figure 2:
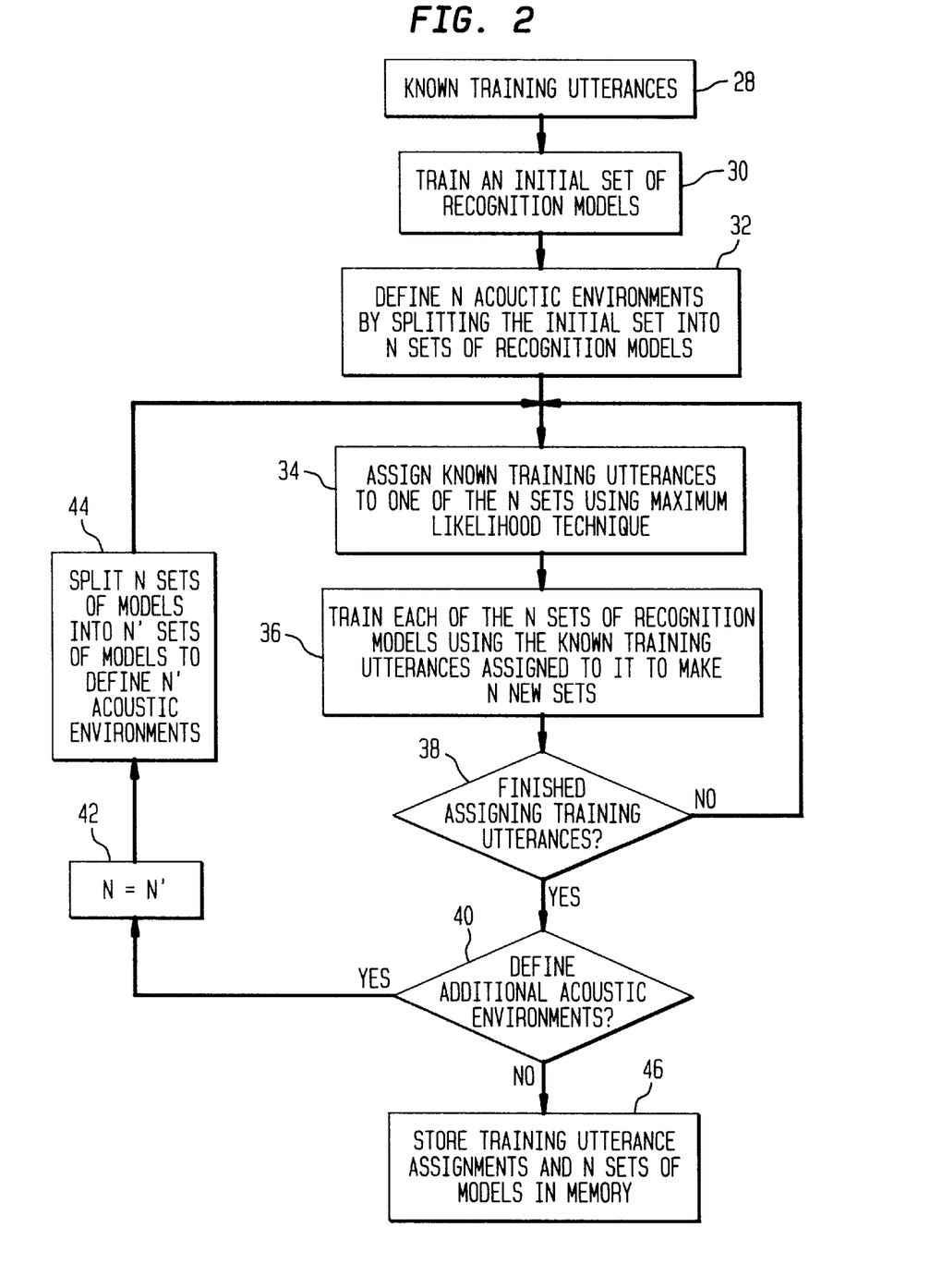
FIG. 2 is a process flow diagram illustrating a first stage of training according to the principles of the invention.

The first stage of making the set of parallel (i.e., secondary) models is defining multiple acoustic environments by partitioning training data. Training data are partitioned into N acoustic environments using a maximum likelihood technique, which assigns training utterances to one of the N particular acoustic environments, where N is a positive integer, for example two. Referring to FIG. 2, training data in the form of known training speech utterances are provided in step 28. An initial conventional recognition model is provided or trained from the known training utterances in step 30. The conventional recognition model could be a codebook or a set of recognition models in the form of HMMs or GMMs. In the illustrative embodiment of the invention, this initial conventional recognition model will be used as the base set of recognition models stored in the recognition database memory 20 (FIG. 1).

The initial conventional model, the base set of recognition models, is split into N, e.g., two, sets of models in step 32. The split could be a "blind" split, that is, without a guiding principle. The training data is partitioned based on the split. Each known training utterance is scored against both sets of models and assigned to the "best" set of models for that particular training utterance based on the higher score of the training utterance for both sets of models in step 34. The principle of the invention applied is that if the training data have different likelihoods (or the scores are within different ranges of likelihoods) then they come from different acoustic environments. The N (e.g., two) sets of models, which can be viewed as current sets of models, are trained on their associative-data (i.e., on the known training utterances that were assigned to them) to make N new sets of models in step 36.

Numerous training methods can be used for making the N new sets of models. A discriminative form of training is preferred. The N (e.g., two) new sets of models overwrite the N current (i.e., old) sets of models in the classification database memory 22 (FIG. 1).

Then, in step 38 a decision is made whether the aforementioned iterative process steps of defining N particular acoustic environments, assigning known training utterances to particular acoustic environments, and training N new sets of models with the known training utterances assigned to them is completed. The iterative process can become complete, for example, when an error signal tracking the utterance assignment process converges to a predetermined value, when the iterative process has been performed a preselected number of times (or "rounds"), or when known training utterances are no longer being reassigned to new sets of models as a result of the iterative process. If no, the iterative process is not completed, the steps of the iterative process are repeated: assigning each of the known training utterances to the best of the N sets of models based on the score of the known training utterance for both of the N current (formerly new) sets of models, then training (i.e., making) N new sets of models from the known training utterances assigned to each of the N current sets of models, and then storing the N new sets of models in the classification database memory in place of the N current sets of models.

Again, a decision is made in step 38 whether assigning training utterances is finished. If yes, the iterative process is complete, a decision is made in step 40 whether the number N should be changed, that is whether there should be additional partitioning of the known training utterances to define additional acoustic environments.

If yes, additional acoustic environments should be defined, N is changed to N' in step 42 and the N current sets of models are split into N' sets of models, where N' is a different number than N (e.g., change from two defined particular acoustic environments/models to four defined particular acoustic environments/models) in step 44. This can be a blind split, that is, without a guiding principle. The steps in the iterative cycle are performed again and again until there is a reason to stop. Such a reason can be, for example, that an error signal converges to a predetermined value or that the iteration has been performed a preselected number of times.

If no additional acoustic environments will be defined, then the assignments of known training utterances to N particular acoustic environments and the N sets of models which correspond to the N particular acoustic environments are saved in the classification database memory 22 (FIG. 1) in step 46.

Thus, as described previously, the process of defining N acoustic environments produces the best set of models for each of the N acoustic environments and assigns known training utterances to each of the N sets of models. This is used subsequently in stage two of the procedure for training the speech recognition system shown in FIG. 1. The first stage of training the speech recognition system, making the set of parallel models, is completed.

TRAINING STAGE II

The second stage of training the speech recognition system shown in FIG. 1 integrates the set of parallel models with the base set of recognition models such that the speech recognition system can identify an acoustic environment of the unknown speech and project (i.e., transform) the base set of recognition models to a new model space more suitably matching the identified acoustic environment. As a result of training stage one, there are defined N particular acoustic environments and a set of classification models (i.e., classifiers) associated with the N acoustic environments; the classifiers are the N "best" models made during the iterative process of training stage one. The classifiers for each particular acoustic environment resulting from the iterative process of the first stage of training become part of the set of parallel models stored in classification database 22 (FIG. 1). The classifiers in the set of parallel models are used for identifying the appropriate acoustic environment for an unknown test utterance. Each of the set of parallel models also includes a projector, which is the means for transforming (i.e., projecting) the base set of recognition models, which are stored in recognition database 20 (FIG. 1), to be more suitable for the identified acoustic environment.

In the second stage of training the speech recognition system, a base set of recognition models is defined conventionally. In the illustrative embodiment of the invention, the same conventional recognition model used in training stage one is used as the base set of recognition models. The projectors, which are used to adjust the base set of recognition models to match the identified acoustic environment, are defined so that when an unknown test utterance (i.e., "unknown speech") is received during testing, the selected projector can be applied to transform the base set of recognition models to match the acoustic environment of the test utterance.

The projectors are computed in the second stage of training the speech recognition system by discriminative training, e.g., by minimum classification error training, which is a kind of discriminative training. The minimum classification error (MCE) approach to discriminative training is based on the principle of error rate minimization. MCE training of a recognizer finds the best HMM parameter set for the discriminant function to minimize the error, which is defined as the likelihood that the trained recognizer will misrecognize the set of utterances in the known training set. The statistical model of each basic recognition speech unit is obtained through discriminative analysis. The objective of such MCE training is to minimize the recognition error rate and is achieved by calculating a misrecognition measure indicating the likelihood that a recognizer having a given training will commit a recognition error based on its present state of training. In MCE training, the misrecognition measure reflects the difference between (i) a recognizer score for a known training utterance based on the correct recognition model for the known training utterance, and (ii) an average of one or more recognizer scores for the known training utterance based on one or more other confusably-similar recognition models. A minimum classification error (MCE) discriminative training system is described in detail in U.S. Pat. No. 5,579,436 issued Nov. 26, 1996 to Chou et al., entitled "RECOGNITION UNIT MODEL TRAINING BASED ON COMPETING WORD AND WORD STRING MODELS", which is incorporated by reference as if fully set forth herein.

MCE training, or another type of discriminative training, is used to compute the projector that will most effectively transform the base set of recognition models based on a particular acoustic environment identified during testing. Each projector is a transformation which can be applied to the model parameters stored in the recognition database 20 (FIG. 1).

Figure 3:
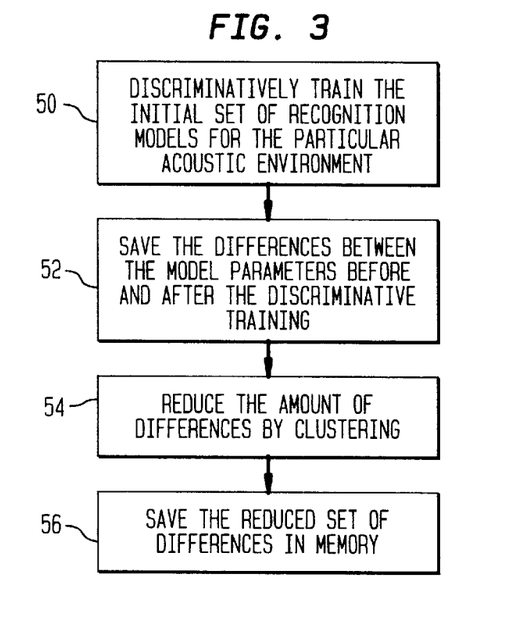
FIG. 3 is a process flow diagram illustrating a second stage of training according to the principles of the invention.

Referring to FIG. 3, for each of the N particular acoustic environments defined in training stage one, the conventional base set of recognition models is discriminatively trained in step 50 with the known training utterances that were assigned to that particular acoustic environment during the partitioning process of training stage one. MCE training of the model parameters of the base set of recognition models, using the known training utterances assigned to that particular acoustic environment, projects the model parameters to a model space more suitable for the particular acoustic environment. The parameters of the base set of recognition models have a certain state before discriminative training and are transformed by the discriminative training to a different state. Not all model parameters are necessarily changed. Some, all, or none may be changed.

For each model parameter, the difference between its state before discriminative training and its state after discriminative training represents that particular acoustic environment, or more specifically, a change to the model parameter based on that particular acoustic environment. This change to the model parameters of the base set of recognition models caused by such discriminative training represents distortion due to that particular acoustic environment.

The differences between the model parameters of the base set of recognition models in its original state and the new model parameters of the projected base set of recognition models, arrived at from discriminative training using the known training utterances assigned to that particular acoustic environment, are saved in step 52. The model transformation projector for that particular acoustic environment is made from the differences saved in step 52.

The projector for that particular acoustic environment can be all the differences, for each model parameter, between the original model parameter state and the new model parameter state. However, the base set of recognition models may have, for example, 3500 parameters and that is potentially an unwieldy amount of data. The differences reflecting the distortion due to that particular acoustic environment are usually small changes to the model parameters (e.g., a relatively small shift to the mean of a Gaussian distribution); and, the difference for each of the model parameters from the discriminative training with the known training utterances assigned to that particular acoustic environment is similar to many of the other differences, since the differences are caused by the same acoustic environment.

Because each model parameter difference is small, and because similar model parameter differences are clustered, all the differences (i.e., for every model parameter) need not be saved to attain the optimal performance. Instead of saving 3500 differences for 3500 model parameters, a reduced set of differences is saved according to the principles of the invention. To reduce the amount of differences saved in memory, the model parameter differences arrived at by discriminative training for each of the N particular acoustic environments are clustered using conventional clustering techniques in step 54. The conventional clustering technique decides which among the transformations represented by the differences are similar. The cluster of particular differences is saved in step 56 and used instead of all the differences for all the model parameters per particular acoustic environment.

Figure 4:
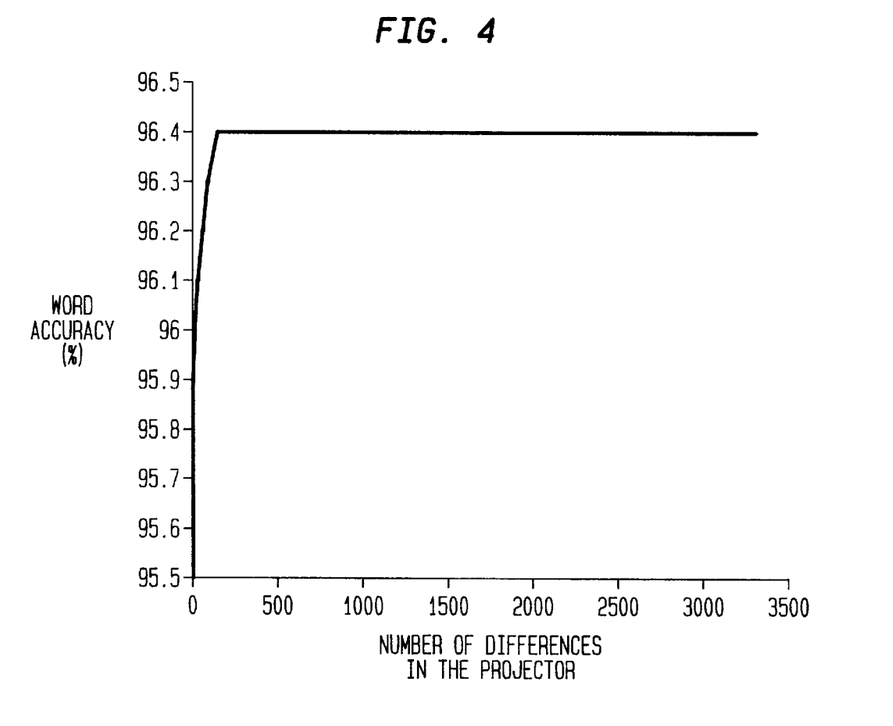
FIG. 4 is a plot illustrating word accuracy versus the number of differences in the projector for a wireline acoustic environment according to the principles of the invention.

The reduced set of differences stored in the classification database 22 as the projector for each particular acoustic environment/parallel model is the means for adjusting the base set of recognition models to match that particular acoustic environment to minimize acoustic mismatch between the unknown test utterance and the base set of recognition models stored in the recognition database 20. Clustering can reduce the number of differences saved as the projector for a particular acoustic environment for a 3500 parameter base set of recognition models to, for example, 400 differences without degradation in speech recognition performance as illustrated for a particular "Wireline" acoustic environment by the graph of FIG. 4.

A parallel model for each acoustic environment is integrated with the base set of recognition models as a result of the second stage of training. Each parallel model stored in the classification database 22 includes a classifier and a projector, wherein the projector is the limited set of differences for that acoustic environment which can be applied to transform the base set of recognition models to be more suitable for that acoustic environment.

The foregoing training process does not require a large amount of training data, saves memory, saves processing time, and improves speech recognition performance.

In testing, sound waves representing an unknown test utterance ("unknown speech") are received by the acoustic transducer 10. The acoustic transducer 10 changes the sound waves into an electrical unknown speech signal 12. The feature extractor 14 generates a sequence of feature vectors 16 characterizing the unknown speech signal 12. The sequence of feature vectors 16 is scored by probabilistic alignment against each of the classification models in the set of parallel models stored in the classification database 22 to generate a score of the unknown test utterance for each classification model. The classification processor 18 identifies the particular acoustic environment associated with the highest scoring classification model as the acoustic environment best matched to that of the unknown test utterance.

The classification processor 18 then emulates the matched acoustic environment by transforming the base set of recognition models. In the illustrative embodiment, the projector is the limited set of differences in the parallel model that contains the classification model that scored highest for the unknown test utterance. The classification processor 18 applies the particular parallel model projector to the base set of recognition models stored in recognition database 20, thereby projecting the base set of recognition models to match the identified acoustic environment. Finally, the unknown test utterance is recognized conventionally based on a probabilistic alignment of the sequence of feature vectors 16 with the projected base set of recognition models. The speech recognition system generates a recognized speech signal.

The parallel models integration (PMI) technique taught herein is complementary to other techniques for improving and enhancing robustness in speech recognition, such as signal bias removal, which can be used in addition to PMI. Signal bias removal is described in detail in U.S. Pat. No. 5,590,242 issued Dec. 31, 1996 to Juang et al., entitled "SIGNAL BIAS REMOVAL FOR ROBUST TELEPHONE SPEECH RECOGNITION", which is incorporated by reference as if fully set forth herein.

Adaptation is the process of improving the recognition models during testing. In conventional model adaptation techniques, the recognition models change again and again, and can become far removed from their original state. The present invention enables efficient model adaptation during testing, whether the adaptation is supervised or unsupervised.

According to the present invention, the base set of recognition models is not permanently altered during testing. Rather than adapting the entire model during speech recognition, model adaptation during testing according to the present invention changes only the projectors for particular identified acoustic environments. The projectors for a particular acoustic environment can be optimized given a set of adaptation data for that particular acoustic environment. Speech recognition performance can continue to improve during adaptation without degrading the performance of the system in other particular acoustic environments.

Experiments were performed on continuous digit recognition with three particular acoustic environments: a wireline network, a cellular network and preteen subscribers. The experiments showed that the parallel models integrated speech recognition system according to the principles of the invention is capable of achieving nearly matched recognition performance for each acoustic environment and outperforming a general purpose HMM-based speech recognition system. Furthermore, the parallel models integrated speech recognition system is only 6% slower than such a general purpose HMM-based speech recognition system, wherein each parallel model including a set of less than 400 differences to achieve matched performance.

Three speaker-independent connected-digit database set were evaluated in this study. The results are described as follows with reference to TABLE I.

TABLE I

| System | Preteen | Wireline | Wireless |
|---|---|---|---|
| Baseline (%) | 86.6 | 98.8 | 94.9 |
| Global (%) | 89.5 | 99.1 | 96.3 |
| Matched (%) | 93.5 | 99.2 | 96.4 |
| PMI (%) | 93.2 | 99.2 | 96.4 |

The first database set, "Preteen", included preteen subscribers between 8 and 16 years of age repeating 1 to 10 digit strings over a wireline telephone network. The "Preteen" database set was divided into 1700 utterances for training and 915 utterances for testing.

The second database set, "Wireline", included adult speech from a variety of field trial collections. The "Wireline" database set was divided into 9600 utterances for training and 516 utterances for testing.

The third database set, "Wireless", included adult speech that was collected over a cellular telephone network. The "Wireless" database set was divided into 15500 utterances for training and 4800 utterances for testing.

The base set of recognition models included a set of left-to-right continuous density HMMs that were previously trained by maximum likelihood estimation (MLE) on a standard telephone speech corpus. There were a total of 274 context-dependent subword models, each having 3 to 4 states, with 4 mixture components per state.

The baseline performance of the parallel models integrated speech recognition system in terms of word accuracy is shown in TABLE I at "Baseline". These results were obtained with cepstral based features following signal bias removal and unknown length grammar.

The performance of the parallel models integrated speech recognition system following. integrated signal bias removal and discriminative training is shown in TABLE I at "Global". These results correspond to a general purpose HMM-based speech recognition system trained on the entire three database sets.

If the acoustic environment is known for each testing utterance, one could train and test on each database set individually. The results of this experiment is shown in TABLE I at "Matched", and represent the upper limit for the performance of the parallel models integrated speech recognition system.

Training of the parallel models integrated speech recognition system was conducted as follows. Each database set was considered as a separate acoustic environment. For acoustic environment classification, GMMs with 64 mixture components were trained by MLE as the classification models (i.e., classifiers) resulting in just over 90% acoustic environment classification.

To make the projectors for transforming the base set of recognition models, a set of discriminatively-trained differences were computed following signal bias removal. Each set ranged from 200 to 400 differences per acoustic environment. This corresponds to 6% to 12% the number of mixture components in the base set of recognition models.

The word accuracy of the parallel models integrated speech recognition system is shown at "PMI" in TABLE I. It is clear that these results are better, in terms of word accuracy, than the "Global" results especially for the "Preteen" database set and nearly the same as those presented for the "Matched" condition. The overall memory size of the set of parallel models amounted to 35% of the base set of recognition models.

While several particular forms of the invention have been illustrated and described, it will also be apparent that various modifications can be made without departing from the spirit and scope of the invention.

What is claimed is:

1. A signal processing method for recognizing unknown speech signals, comprising the following steps:

receiving an unknown speech signal representing unknown speech;

generating a sequence of feature vectors characterizing the unknown speech signal;

identifying an acoustic environment of the unknown speech based on the sequence of feature vectors and a set of classification models;

adjusting a base set of recognition models to reflect the identified acoustic environment by providing a model transformation projector corresponding to the identified acoustic environment, and applying a transformation based on the model transformation projector to the base set of recognition models;

recognizing the unknown speech signal based on the sequence of feature vectors and the set of adjusted recognition models; and adapting the model transformation projector based on an adjustment made to the base set of recognition models.

2. A method of training a speech recognition system, comprising the following steps:

(A) providing a base set of recognition models and model parameters associated therewith which are stored in a recognition database;

(B) splitting the base set of recognition models into N sets of current models, thereby defining N particular acoustic environments corresponding to the N sets of current models;

(C) storing the N sets of current models in a classification database;

(D) scoring one or more known training utterances against each of the N sets of current models;

(E) assigning each of the known training utterances to one of the N particular acoustic environments based on the highest score of the known training utterance for the N sets of current models;

(F) training each of the N sets of current models associated with the N particular acoustic environments using the known training utterances assigned to that particular acoustic environment, thereby making N sets of new models;

(G) storing the N sets of new models in the classification database in place of the N sets of current models; and (H) for each particular acoustic environment, (i) discriminatively training the base set of recognition models using the known training utterances assigned to that particular acoustic environment to project the base set of recognition models to reflect that particular acoustic environment,
(ii) saving a set of the differences between the state of the model parameters of the base set of recognition models before discriminative training and after discriminative training which corresponds to the distortion caused by the particular acoustic environment,
(iii) clustering the differences arrived at by discriminative training, and
(iv) saving the clustered set of differences as a model transformation projector which can be used for adjusting the base set of recognition models to reflect that particular acoustic environment.

3. A method as defined in claim 2, further comprising the step of:

repeating steps (D)–(G) a preselected number of times.

* * * * *